Nov. 19, 1957 N. T. STARR 2,813,641
AUXILIARY COMPRESSING PANEL FOR REFUSE TRUCKS
Filed Jan. 26, 1955 8 Sheets-Sheet 1

INVENTOR.
Norbert T. Starr.
BY
Harness, Dickey & Pierce
ATTORNEYS.

Nov. 19, 1957 N. T. STARR 2,813,641
AUXILIARY COMPRESSING PANEL FOR REFUSE TRUCKS
Filed Jan. 26, 1955 8 Sheets-Sheet 3

FIG. 3.

INVENTOR.
Norbert T. Starr
BY
Harness, Dickey & Pierce
ATTORNEYS.

Fig. 6

Nov. 19, 1957  N. T. STARR  2,813,641
AUXILIARY COMPRESSING PANEL FOR REFUSE TRUCKS
Filed Jan. 26, 1955  8 Sheets-Sheet 7

INVENTOR.
Norbert T. Starr.
BY
Harness, Dickey & Pierce
ATTORNEYS.

United States Patent Office 2,813,641
Patented Nov. 19, 1957

2,813,641

AUXILIARY COMPRESSING PANEL FOR REFUSE TRUCKS

Norbert T. Starr, Detroit, Mich., assignor to Gar Wood Industries, Inc., Wayne, Mich., a corporation of Michigan Application January 26, 1955, Serial No. 484,224

25 Claims. (Cl. 214—83.3)

This invention relates to vehicles for loading and compressing refuse and the like, and more particularly to auxiliary means for compressing the refuse into the forward portion of the vehicle.

This application is related to pending U. S. application, Serial No. 245,469, filed September 7, 1951, and now Patent No. 2,733,820, by the present applicant, and is a continuation-in-part of applicant's co-pending application Serial No. 259,672, filed December 3, 1951, now abandoned. The former application discloses a compressor for refuse trucks and the like having an arcuate hopper within which is disposed a swingable compressing panel operated by power-actuated means. This panel, together with a retaining panel more fully described in said copending application, forces the refuse through the rear truck body opening in a forward and upward direction, so that the refuse is piled in the rear portion of the truck body. One of the problems encountered in this construction is the tendency of the refuse pile to maintain its position in the rear portion of the truck body, since there is no horizontally directed force operating on the pile to positively carry it forward. This action creates the danger of jamming and blocking the truck body passageway, thus tending to impair the efficiency of the device.

It is an object of the present invention to overcome this problem and to provide an auxiliary construction adapted for use with a refuse compressor such as is disclosed in the aforesaid application Serial No. 245,469, which will operate to positively force the refuse collected at the rear portion of the truck toward the forward portion, thereby greatly increasing the efficiency of the unit.

It is another object to provide a compressing means for refuse and other trucks, which comprises a movable compressing panel at the lower portion of the material entrance, a retaining panel for closing the opening used by the compressing panel when the latter is retracted, and an auxiliary panel disposed in the upper portion of said entrance, said auxiliary panel serving to move the material forced into the truck by the compressing panel toward the opposite end of said compartment.

It is also an object to provide a refuse compressing mechanism of the above nature, in which the auxiliary panel carries out its compressing and retracting movements in the time interval between the start of the retracting movement of the compressing panel and the end of the next compressing movement of the compressing panel.

It is another object to provide an auxiliary panel of the above character which has interconnecting means for operation concurrently with the operation of the main compressing panel, so that its action will be coordinated with the depositing of refuse in the truck body.

It is a further object, in one form of the invention, to utilize the power made available by the compressing panel actuating means during the rearward movement of the compressing panel, by providing mechanical means for operating the auxiliary panel from the compressing panel actuator.

It is also an object, in another form of the invention, to provide a compressing device of the above nature in which hydraulic means are utilized to actuate the auxiliary panel, this hydraulic means being interconnected with separate hydraulic actuating means for the compressing panel, whereby the execution of the auxiliary panel cycle of movement is coordinated with the positions of the compressing panel.

It is another object to provide a hydraulically actuated compressing device of the above nature in which the auxiliary panel executes its pushing and retracting movements after the compressing panel has reached its fully retracted position and before it starts further movement in a compressing direction.

It is a further object to provide a compressing device as described above in which means are provided for insuring retraction of said hydraulically actuated auxiliary panel even though the auxiliary panel is incapable of executing a full pushing stroke because of an excessive blockage of refuse, thus preventing any damage to the auxiliary panel upon the next compressing movement of the compressing panel.

It is another object, in a further form of the invention, to provide a compressing device of the above nature in which the auxiliary panel executes a pushing stroke after the compressing panel has completed its retracting stroke, but in which the auxiliary panel is not retracted until after the retaining panel has been retracted upon the start of the next compressing movement of the compressing panel, thus minimizing the possibility of material being inadvertently carried back by the auxiliary panel into the area occupied by the actuating mechanism.

It is also an object to provide a device of the above nature which is relatively inexpensive to manufacture and install and is of simple construction, minimizing the danger of operational failure.

Other objects, features, and advantages of the present invention will become apparent from the subsequent description taken in conjunction with the accompanying drawings.

In the drawings:

Figure 6 is a rear elevational view of the embodiment of Figure 5 showing the relative disposition of the cylinders;

Figure 7 is a circuit diagram showing a suitable hydraulic system for the embodiment of Figures 5 and 6, the auxiliary panel actuating means being interconnected with the hydraulic actuating means of the compressing panel, the diagram showing an arrangement in which the auxiliary panel carries out pushing and retracting movements while the compressing panel remains in fully retracted position;

Figure 1:
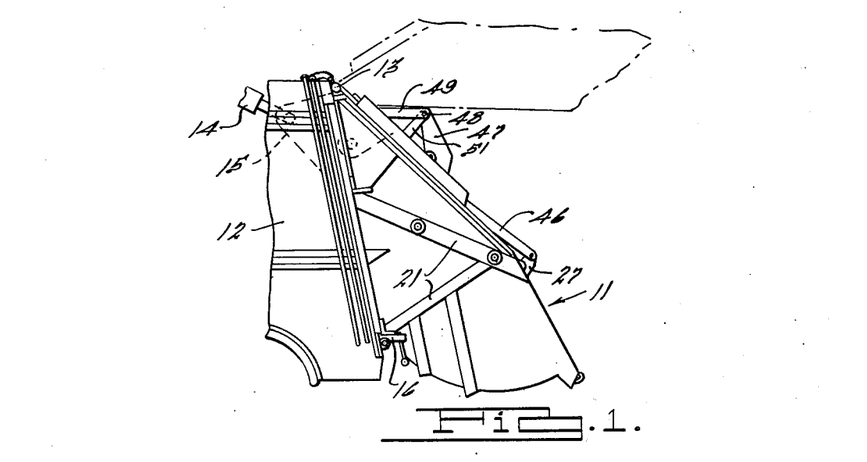
Figure 1 is a side elevational view of the rear portion of a truck body carrying a refuse compressor with the auxiliary panel installed thereon, the auxiliary panel having a mechanical actuating linkage interconnected with the hydraulic actuating means for the compressing panel.

Although the auxiliary panel of the present invention is shown as adapted for use with the compressor of the aforesaid copending application Serial No. 245,469, it will be understood that the principles embodied in the invention are equally applicable to other types of compressing devices. Since the illustrated compressor is fully described in the aforesaid application and has many details which in themselves form no part of the present invention, the construction need not be described in detail. The compressor is generally indicated at 11 and forms the tail gate of a truck body 12 which may be of the closed type adapted to collect refuse. The tail gate 11 is pivoted at 13 to the rear end of the truck body and is adapted to swing between a closed position shown in solid lines in Figure 1 and a raised or dumping position shown in dot-dash lines. One or more hydraulic cylinders 14 or other power means are connected to extensions 15 of the tail gate to swing the gate between its operative positions, and clamping means 16 may be provided for locking the tail gate in its closed position. The truck body is, of course, provided with tilting means (not shown) for use when the refuse is to be discharged.

The tail gate 11 further comprises an arcuate hopper 17 at its lower end which opens rearwardly to receive refuse deposited over its rear lip 18. The forward lip 19 of the hopper is substantially contiguous with the floor of the truck body, and the hopper has side walls 20 strengthened by a plurality of ribs 21. Pivoted at 22 for swinging movement within the hopper is a main compressing panel 23, the lower end 24 of which is adapted to sweep over the arcuate hopper 17. The compressing panel 23 swings between the retracted or loading position shown in Figure 3 and a compressing position shown in Figure 2. The compressing panel is actuated between its operative positions by power actuated means including a pair of hydraulic cylinders 25 having pistons 26, these pistons being connected to the compressing panel by linkage means described more fully in the aforesaid application. The hydraulic cylinders and their corresponding linkage means are disposed on each side of the tail gate in more or less symmetrical relation so that only one cylinder and linkage means is visible in the figures and need be described. Each linkage means includes a link 27 pivotally connected between the piston 26 and the compressing panel, and a pawl member 28 pivoted to an intermediate portion of link 27 and adapted to engage a shoulder 29 on the compressing panel during a portion of the cycle. The cycling means is preferably arranged so that compressing panel 23 moves by its own weight and without power from the retracted position of Figure 3 to the position shown in Figure 4 in which the compressing panel closes the hopper, the power means being utilized to drive the compressing panel from the closed position of Figure 4 into the compressing position of Figure 2.

Figure 2:
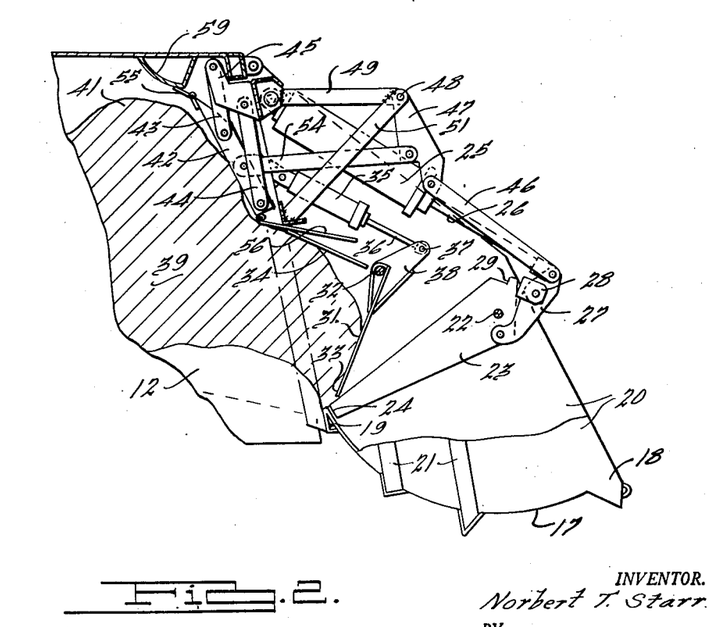
Figure 2 is an enlarged side elevational view of the compressor of Figure 1 with portions broken away, showing the device with the compressing panel in compressing position.

A retaining panel 31 is also pivoted at 32 between side walls 20 of the hopper, and the lower edge 33 of the retaining panel is adapted to be engaged by the compressing panel as it comes forward, the retaining panel thus serving to remove the refuse from the main panel surface and force it forwardly and upwardly into the truck body. An inclined shield 34 extending across the hopper above and forwardly of the retaining panel serves to guide the refuse during its forward and upward movement. Means are provided for locking the retaining panel in its retaining position shown in Fgure 2 when the compressing panel 23 is retracted, and this means may comprise a hydraulic cylinder 35 having a piston 36 pivotally connected at 37 to an extension 38 of the retaining panel. Cylinder 35 also preferably serves to retract the retaining panel into the position shown in Figure 4 when the compressing panel 23 drops to its closed or intermediate position.

Figure 3:
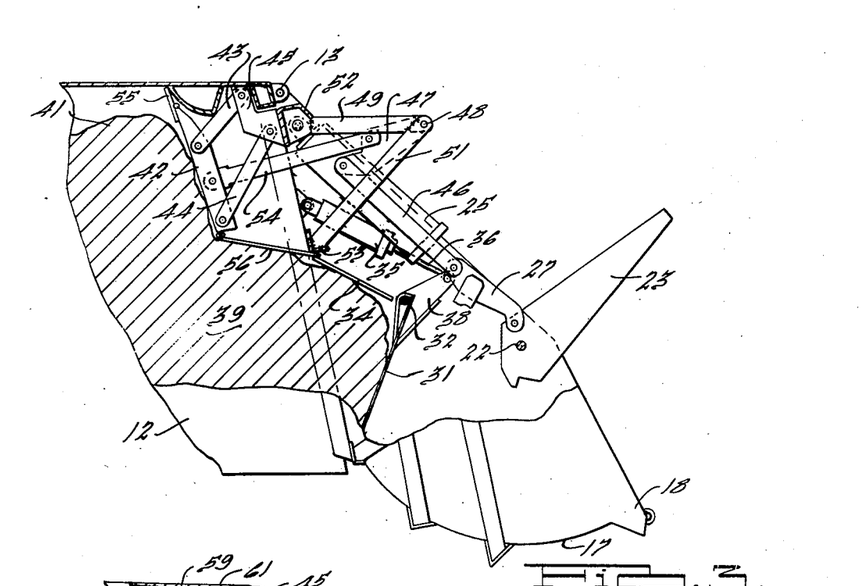
Figure 3 is a view similar to Figure 2 but with the compressing panel in its retracted or loading position.
Figure 4:
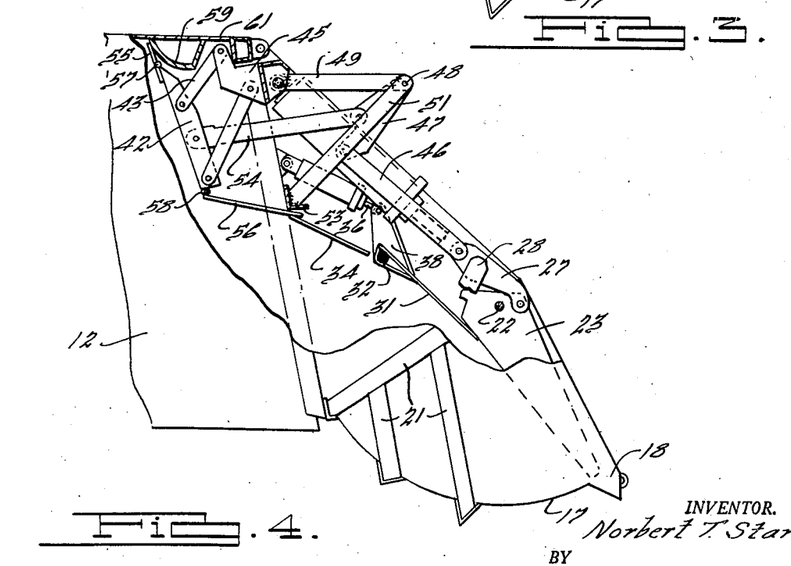
Figure 4 is a view similar to Figures 2 and 3 but with the compressing panel in its closed position.

In describing the operational cycle of the mechanism thus far set forth, all of which is disclosed in the aforesaid application Serial No. 245,469, we may start from an initial condition in which the compressing panel 23 is in its fully retracted position and the retaining panel 31 is in its retaining position, as shown in Figure 3. After the refuse has been deposited in hopper 17, the cycle control means (not shown) is actuated to cause the compressing panel to move downwardly without power to the closed or intermediate position of Figure 4. At this point the retaining panel 31 is retracted to cause its lower edge 33 to engage the surface of the compressing panel. The power actuated means is then operated to drive the compressing panel into its compressing position shown in Figure 2, the retaining panel following this movement because of its engagement with the compressing panel. During this movement the refuse deposited in hopper 17 will be forced forwardly and then upwardly by the compressing panel and the retaining panel 29 to form a pile or mass as indicated by the shaded area 39 of Figure 2. It will be seen that this shaded area has a peak 41 which is created by the upward components of the compressing and retaining panel movements. The height and weight of this mass will therefore increase the frictional resistance of the lower portion of the mass, making it more difficult for the panel to force this mass forwardly into the truck. Upon reaching the compressing position, the compressing panel 23 is retracted into its loading position for another cycle, and at the same time the retaining panel 31 is locked in its retaining position to prevent back-sliding of the refuse into the hopper.

The novel and improved auxiliary means of this invention includes a panel 42 which is disposed within the upper rear portion of the truck body. Auxiliary panel 42 extends across the truck body between its side walls and is preferably of such height as to cover about one-third of the body cross-sectional area. The panel is movably supported by one or more upper links 43 and lower links 44 which are pivotally connected between the panel and brackets 45 secured to the upper portion of the tail gate. The relative lengths and pivotal positioning of links 43 and 44 are such as to hold the panel 42 in a slightly downwardly and rearwardly inclined position, and the linkage permits substantial forward and upward translatory movement of the auxiliary panel somewhat in a parallelogram linkage fashion.

Means are provided for actuating the auxiliary panel 42 in coordination with the movements of the compressing panel, and in the embodiment of Figures 1–4 this means comprises oppositely disposed symmetrical sets of linkages, only one of which is shown and need be described. The linkage includes a link 46 pivotally connected at one end to the compressing panel actuating link 27 and at the other end to a crank member 47. This crank member is supported for pivotal movement at its upper end 48 by a pair of brackets 49 and 51 which are secured in spaced relation to the tail gate and which converge to form a pivot support. In particular, the bracket 49 may be secured to an upper cross member 52 of the tail gate, on which brackets 45 are mounted, and the bracket 51 secured to an intermediate tail gate cross member 53. An actuating link 54 is pivotally connected between the crank member 47 and an intermediate portion of the auxiliary panel 42.

The relative positions of these links are such that when the compressing panel moves from its compressing position of Figure 2 into its retracted position of Figure 3, the auxiliary panel 42 will be forced from a position adjacent the rear truck body opening forwardly to a position well in advance of this opening as seen in Figure 3. This action will take place because of the clockwise swinging motion of crank members 47 which forces actuating links 54 to the left as seen in the figures. Due to the arrangement of the crank members and links 46, the major portion of this movement will take place while the compressing panel swings from its compressing position of Figure 2 into the intermediate closed position of Figure 4, and the remainder of the movement takes place while the compressing panel moves into its fully retracted position.

It will be observed that during its operative movement auxiliary panel 42 will maintain its rearwardly and downwardly inclined position because of the action of links 43 and 44. The forward movement will thus cause the auxiliary panel to engage the peak 41 of the refuse pile, pushing this mass of refuse forwardly so that it will occupy a forward portion of the truck and relieve the pressure on the lower mass 39 of the refuse. This will enable the compressing panel 23 and retaining panel to operate more efficiently during their next compressing cycle.

Means are provided for preventing back flow of refuse past the upper and lower edges of auxiliary panel 42, and this means preferably comprises an upper shield plate 55 and a lower shield plate 56 which are connected by hinges 57 and 58 respectively to the upper and lower edges of the auxiliary panel. Shield 55 is of relatively narrow height and cooperates with a downwardly projecting ridge 59 of arcuate cross section in the roof 61 of the truck body. The hinge 57 may be of a resilient type so as to maintain constant engagement between shield 55 and ridge 59. Lower shield 56 is preferably disposed between the intermediate bracing member 53 of the tail gate and upper edge of shield 34, so that shield 56 may slide therebetween during the operative movement of the auxiliary panel.

While the action of the auxiliary panel on the mass of refuse during its forward motion is described above, it is believed that a description of the operation of the entire unit will enable a better understanding of the invention. Starting from an initial condition as shown in Figure 2, in which the compressing panel has just completed a compressing stroke, the auxiliary panel 42 will be in its retracted position adjacent the rear edge of the truck body. When in this position the upper shield 55 will be adjacent the lower edge of guide 59, and lower shield 56 will be retracted within the confines of the tail gate, but not in interfering relation with the tail gate elements. It will be observed that the retaining panel 31, shields 34 and 56, auxiliary panel 42 and shield 55 form a continuous retaining surface to prevent any back-flow of refuse. Upon retraction of the compressing panel 23 into the loading position of Figure 3, the crank members 47 will be swung clockwise by links 46 and actuating links 54 will force auxiliary panel 42 to the left. During this movement the auxiliary panel will be restrained by guide links 43 and 44 to a forward and slightly upward movement parallel to itself against the mass of refuse 41. Shield 55 will slide upwardly along inverted ridge surface 59, and shield 56 will be withdrawn from between members 53 and 34, to maintain the continuous retaining surface mentioned previously. Upon initiation of the next compressing cycle and movement of compressing panel 23 to its closed position of Figure 4, the auxiliary panel 42 will start a retracting motion, so that when the compressing panel forces the next charge of refuse into the truck body, the auxiliary panel is again retracted behind the mass of refuse.

Figures 5–13 show another embodiment of the invention which is similar in principle to the first embodiment but wherein actuating means are provided for the auxiliary panel which are separate from the actuating means for the compressing panel. In particular, hydraulic actuators are provided for the auxiliary panel, and these actuators are coordinated with the hydraulic actuating means for the compressing panel so that upon arrival of the compressing panel at its fully retracted position, the auxiliary panel executes a pushing stroke. In one of the two hydraulic arrangements disclosed in Figures 5–13, the auxiliary panel also executes a retracting stroke while the compressing panel remains in fully retracted position. In an alternative arrangement the retracting stroke of the auxiliary panel is delayed until the compressing panel is about to start the powered portion of its compressing stroke and the retaining panel has been retracted into engagement with the compressing panel.

Figure 9:
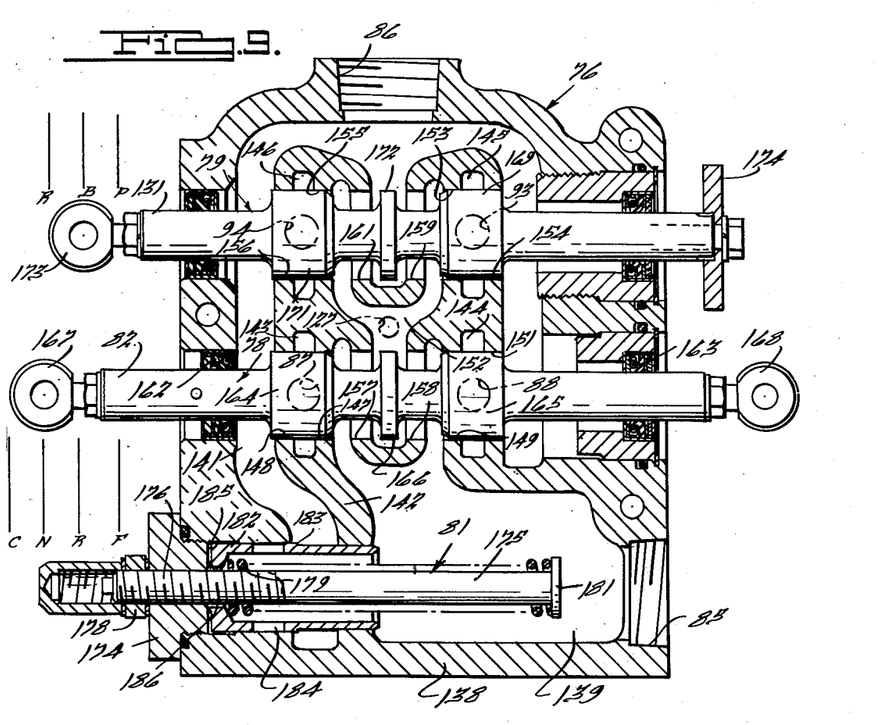
Figure 9 is a cross-sectional view of a suitable valve body construction incorporating the compressing panel and auxiliary panel valve spools in a single housing for use with the hydraulic circuit diagram of Figure 7.
Figure 10:
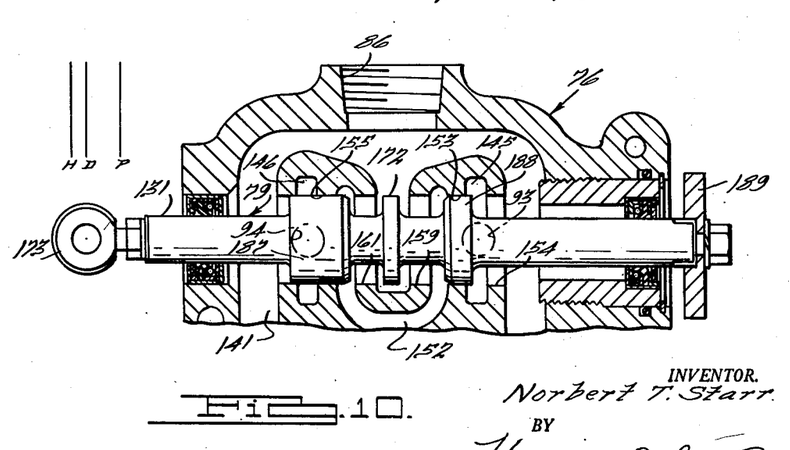
Figure 10 shows a fragmentary cross-sectional view of an alternative construction of the auxiliary panel valve for use with the alternative circuit shown in Figure 8.
Figure 11:
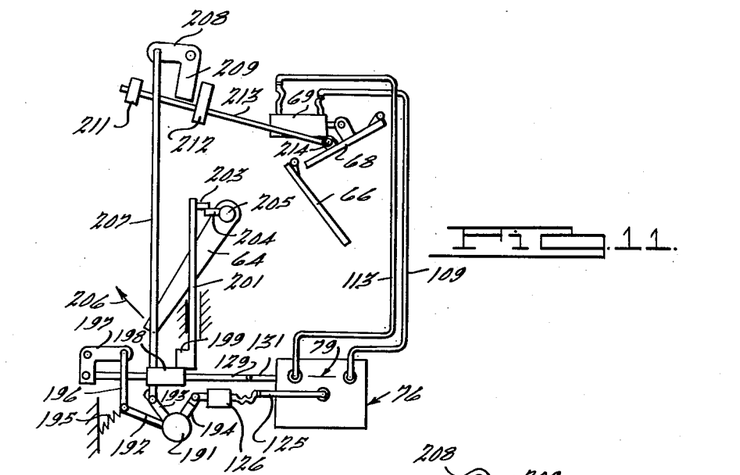
Figure 11 is a schematic view of the control linkage for the auxiliary panel valve of Figures 9 or 10, showing the position of the linkage when the compressing panel in partially retracted position after it has caused the auxiliary panel valve to move from its first position into its pushing position.
Figure 12:
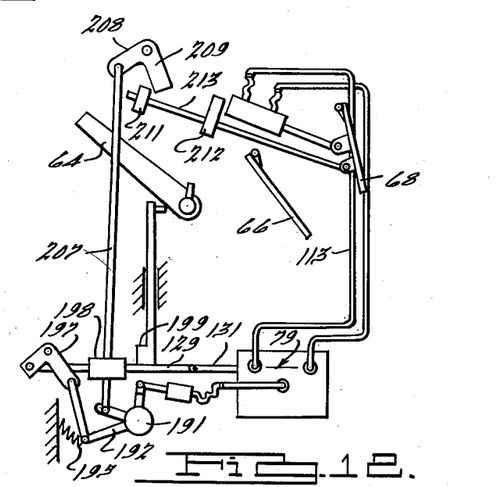
Figure 12 is a view similar to Figure 11 showing the auxiliary panel in its extreme forward position after the compressing panel has reached its fully retracted position, the auxiliary panel having caused movement of the auxiliary panel valve into retracting or holding position.
Figure 13:
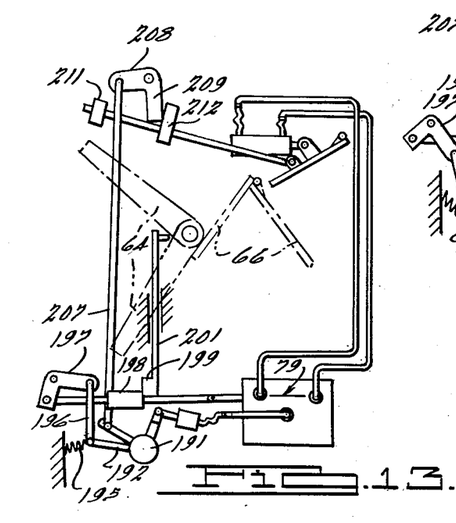
Figure 13 is a view similar to Figures 11 and 12 and showing the auxiliary panel in its fully retracted position in which it causes movement of the auxiliary panel valve to its first position.

The arrangement shown in Figures 5–13 is adapted for use with the hydraulic actuating mechanism and control linkage described in the aforesaid copending application Serial No. 245,469, although it will be understood that other types of actuating mechanisms and control linkages for the compressing and retaining panels could be used within the principles of the invention. A separate control linkage for the auxiliary panel valve, operated in dependence on the positions of the compressing and auxiliary panels, is shown in Figures 11, 12 and 13. The hydraulic circuit includes means for preventing accidental damage to the equipment and insuring the full retraction of the auxiliary panel before the compressing panel performs its next compressing stroke. The auxiliary panel shown for use with the hydraulic actuating arrangement of Figures 5–13 is pivotally mounted, but its cooperation with the compressing panel in forcing the refuse collected at the rear portion of the truck toward the forward portion is similar to that of the first embodiment.

Figure 5:
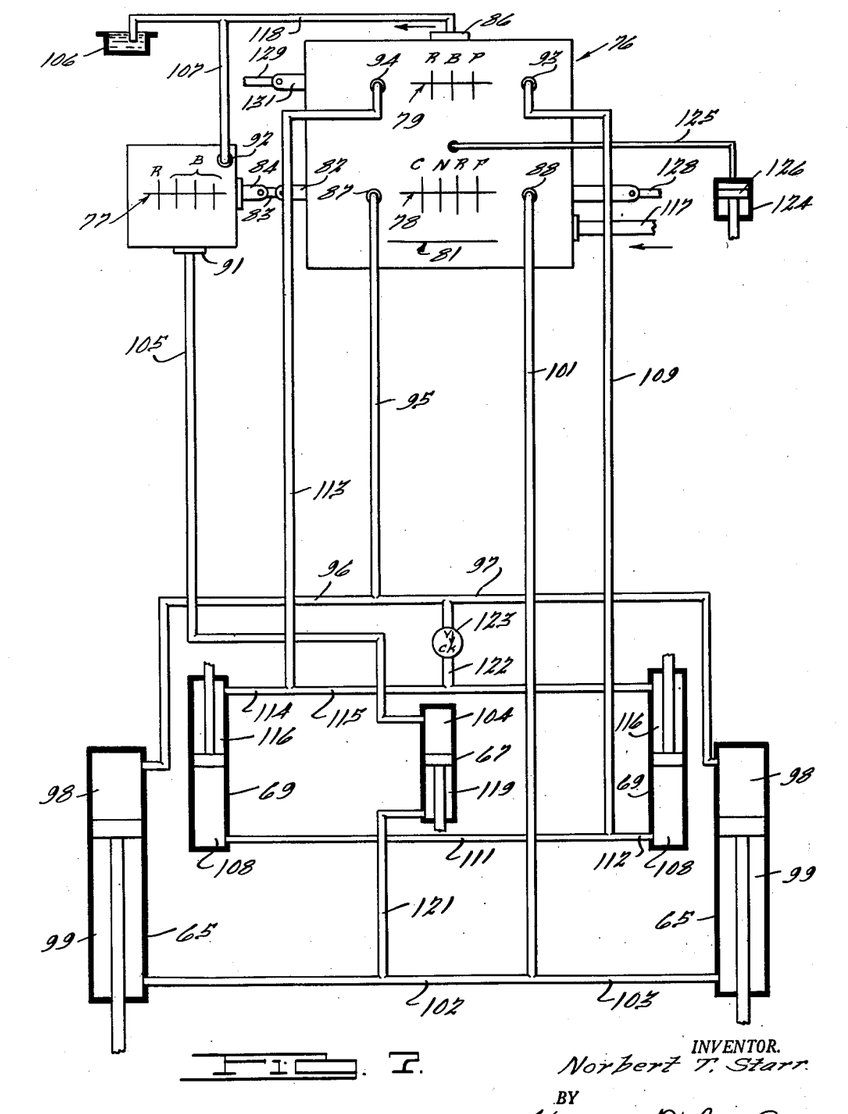
Figure 5 is a side elevational view showing a suitable construction of a modified refuse compressing device utilizing separate hydraulic actuating means for the auxiliary panel, parts being broken away.

Figures 5 and 6 show a suitable construction of the modified form of the invention. The tail gate generally indicated at 62 in dot-dash lines has a hopper 63, a compressing panel 64 actuated by cylinders 65, and a retaining panel 66 with an actuating cylinder 67 as previously described. An auxiliary panel 68 is pivoted on brackets 70 secured to end gate 62. Auxiliary panel 68 is adapted for pivotal movement between a retracted position shown in solid lines in Figure 5 and a forward position shown in dot-dash lines. The actuating means for auxiliary panel 68 comprises a pair of cylinders 69 which are disposed adjacent the sides of tail gate 62 inwardly of cylinders 65, as shown in Figure 6. Cylinders 69 are carried between plates 71 attached to tail gate 62, being supported for rocking movement about pivots 72 by brackets 73. It will be seen from Figure 5 that piston rods 74 of cylinders 69 will be projected forwardly when fluid pressure is applied to the rear ends of the cylinders. Piston rods 74 are pivotally connected at 75 to the rear of auxiliary panel 68, and when the piston rods are extended forwardly cylinders 69 will assume the dot-dash position shown in Figure 5.

The means for controlling fluid flow to cylinders 65, 67 and 69 are disposed within the space in the upper portion of tail gate 62, and comprise a valve body 76, appropriate conduits leading from said valve body to the cylinders, retainer panel valve 77 and the pressure and exhaust connections for the system. Valve body 76, as described in detail below, contains in a single housing the compressing panel valve as well as the auxiliary panel valve, although it will be understood that these valves could be separately housed if desired. For convenience of description, the compressing panel valve, which is located in the lower portion of valve body 76 in Figure 6, is designated as 78, while the auxiliary panel valve in the upper portion of valve body 76 is designated as 79. The extreme lower portion of valve body 76 houses a relief valve 81. As will be seen from Figure 6, spool 82 of compressing panel valve 78 has a direct link 83 connecting it to spool 84 of retaining panel valve 77. In this respect, the operation of the retaining panel valve is different than that described in the aforementioned copending application No. 245,469, wherein the retaining panel valve is actuated by pressure differentials controlled by the compressing panel valve.

Figure 8:
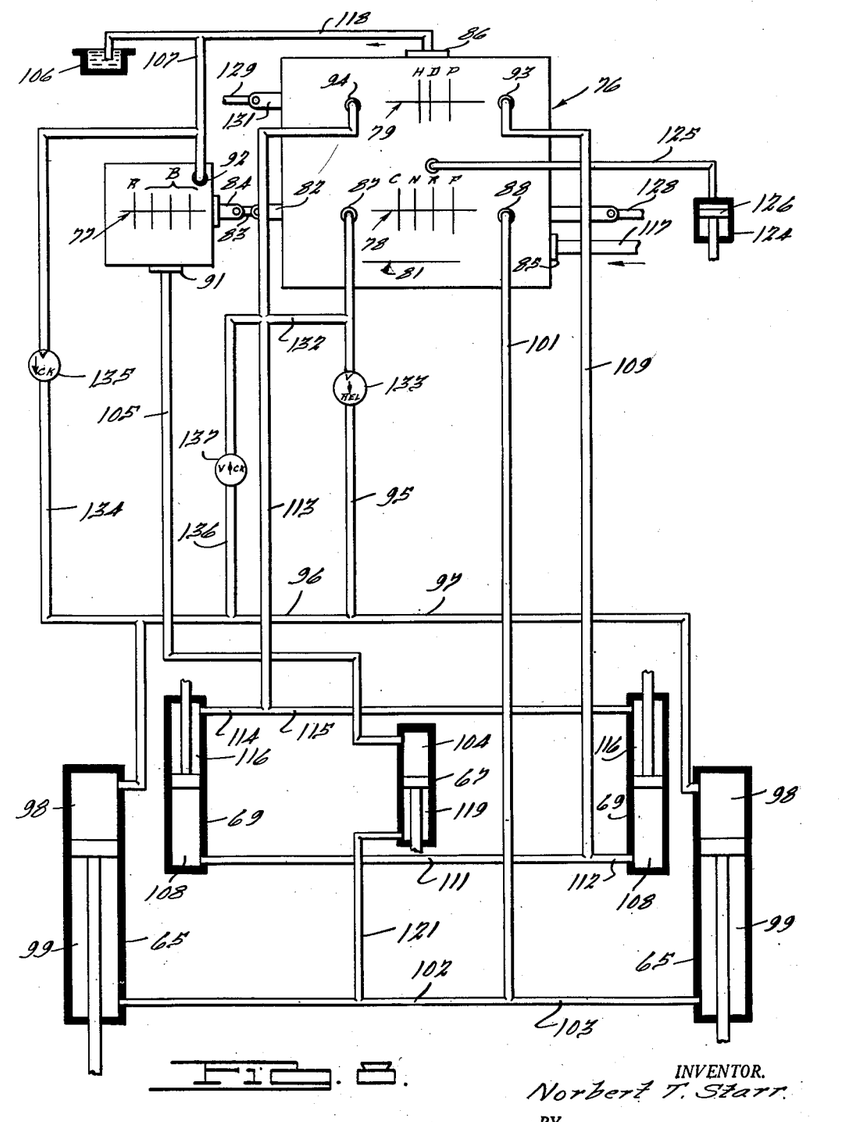
Figure 8 is a hydraulic diagram showing an alternative arrangement in which the auxiliary panel executes its pushing movement while the compressing panel is in fully retracted position, and its retracting movement after the compressing panel starts its powered compressing stroke.

The conduits connecting the various parts of the hydraulic system are partially shown in Figures 5 and 6 and are fully disclosed in the hydraulic diagrams of Figures 7 and 8. Referring to Figure 7, the various positions of valves 77, 78 and 79 are designated on their centerlines. It will be seen that compressing panel valve 78 has four positions, a neutral or blocking position N, a float position F, a compressing position C, and a retracting position R. These positions correspond to the positions described for the compressing panel valve in the abovementioned copending application Serial No. 245,-469, the valve having the same functions in both applications. Specifically, when valve 78 is in its float position F, supply port 85 is connected to exhaust port 86, compressing port 87 is connected to both supply port 85 and exhaust port 86, and retracting port 88 is connected to exhaust port 86. With valve 78 in compressing position C, compressing port 87 is connected to supply port 85 and retracting port 88 connected to exhaust port 86. In retracting position R, retracting port 88 is connected to supply port 85 and compressing port 87 is connected to exhaust port 86. In neutral position N, both ports 87 and 88 are blocked.

Retaining panel valve 77, which is mechanically linked with valve 78, has two operative positions, a blocking position B and a retracting position R. When compressing panel 78 is in position N, R or F, cylinder port 91 and tank port 92 of retaining panel valve 77 are blocked; when valve 78 is in position C, valve 77 is in position R, in which ports 91 and 92 are connected to each other.

Auxiliary panel valve 79 has three operative positions as shown in Figure 7. The central or first position B is a blocking position in which compressing port 93 and retracting port 94 are blocked. The right hand position P is a position in which pushing port 93 is connectible to supply port 85 and retracting port 94 is connected to exhaust port 86. The left hand position of valve 79 is a retracting position R in which retracting port 94 is connectible to supply port 85 and compressing port 93 is connected to exhaust port 86. The connection of supply port 85 to ports 93 and 94 depends on the position of compressing panel valve 78. When valve 78 is in positions N or F, these connections may be established, but if valve 78 is in positions C or R, fluid supply is cut off from valve 79. As a consequence of this, valve 79 may first be moved to, say, position P to "arm" pushing port 93, and this port may be subsequently pressurized by arrival of valve 78 at position N.

Conduits connecting the ports of the various valves with their respective cylinders are shown in Figure 7. A main conduit 95 and branch conduits 96 and 97 connect compressing port 87 of valve 78 with the piston chambers 98 of compressing panel cylinders 65. Retracting port 88 is connected to the piston rod chambers 99 of cylinders 65 by a main conduit 101 and branch conduits 102 and 103. Port 91 of retaining panel cylinder valve 77 is connected to piston chamber 104 of retaining panel cylinder 67 by a conduit 105, while port 92 of this valve is connected to tank 106 by a conduit 107. Port 93 of auxiliary panel valve 79 is connected to piston chambers 108 of auxiliary panel cylinders 69 by a main conduit 109 and branch conduits 111 and 112. Port 94 of valve 79 has a main conduit 113 and branch conduits 114 and 115 connecting it to piston rod chambers 116 of cylinders 69.

Supply port 85 of valve housing 76 has a conduit 117 which supplies pressure fluid from a suitable source such as the power take-off of the refuse truck. Port 86 of valve housing 76 is connected to tank 106 by a conduit 118. The piston rod chamber 119 of retaining panel cylinder 67 is connected to branch conduit 102 by a conduit 121. A conduit 122 is provided between branch conduit 97 and branch conduit 115, and a check valve 123 is disposed in conduit 122 permitting fluid flow only from conduit 97 to conduit 115. A slave cylinder 124 is also shown in Figure 7, the purpose of this cylinder being described below. A conduit 125 connects piston chamber 126 of cylinder 124 to a port 127 which, as described below with respect to Figure 9, is connected to the fluid supply for auxiliary panel cylinders 69. Figure 7 also shows a control link 128 connected to spool 82 of valve 78 and a control link 129 connected to spool 131 of valve 79. Control link 128 for compressing panel valve 78 is the equivalent of link 118 in the abovementioned copending application Serial No. 245,469 and is connected to the control linkage shown in Figures 11–14 of said application. Since this control linkage operates in the same manner in the present embodiment, it need not be described in detail here. The control linkage connected to link 129 for the auxiliary panel valve is described in detail below.

In describing the operation of the hydraulic circuit shown in Figure 7, it is perhaps advantageous to first mention the main purposes of this circuit. As far as operation of compressing panel 64 is concerned, the hydraulic circuit has the same purposes as that of the aforementioned copending application. Compressing panel 64 is permitted to float down from its extreme retracted position to an intermediate position closing hopper 63. Chambers 98 of cylinders 65 are then pressurized to force panel 64 forwardly and upwardly in a compressing stroke. At the end of its compressing stroke, chambers 99 are pressurized to retract panel 64 into its fully retracted position. The compressing panel is then held in this position until the operator initiates the next cycle.

Retaining panel cylinder 67 also serves the same purposes described in the above-mentioned copending application. During the period in which compressing panel 64 is in its fully retracted position and is floating down to its intermediate position, the piston of cylinder 67 is in its extended position locking the retaining panel in its retaining position. As compressing panel 64 starts its compressing stroke, the fluid in chamber 104 is released and retaining panel 66 is retracted by virtue of pressure differentials between chambers 104 and 119 as well as an aiding spring shown in the copending application. The opening of both chambers 104 and 119 to fluid flow permits retaining panel 66 to be carried forwardly by compressing panel 64. As the compressing panel begins its retracting stroke, the fluid in chamber 104 is again blocked so that retaining panel 66 is locked in its retaining position.

During the floating movement, compressing movement, and retracting movement of compressing panel 64, auxiliary panel 68 is locked in its retracted position by blocking of fluid in chambers 116 of cylinders 69. Cylinders 69 serve to produce a forward pushing stroke of auxiliary panel 68 after compressing panel 64 has reached its fully retracted position. For this purpose, piston chambers 108 of cylinders 69 are pressurized. After the pushing stroke is completed, chambers 116 of cylinders 69 are pressurized to retract panel 68. The fluid in chambers 116 is then blocked in order to lock panel 68 in its retracted position until the next cycle.

Assuming an initial condition in which compressing panel 64 is in its fully retracted position and auxiliary panel 68 has just completed its retracting stroke, valve 78 will be in position N and valve 79 in its first position B. Pistons of both cylinders 65 and 69 will be fully retracted, and fluid will be blocked in chambers 99 and 116. Retaining panel valve 77 will also be in position B with fluid blocked in chamber 104 and the piston of cylinder 67 in extended position.

To start a new cycle, valve 78 is moved by the operator from position N to position F through link 128. This will permit compressing panel 64 to float down to its intermediate position, fluid flowing from port 87 into chambers 98 and from chambers 99 to port 88. During this time valve 77 and 79 will remain in their blocking positions.

After compressing panel 64 has reached its intermediate position shown in solid lines in Figure 5, valve 78 is moved to position C and valve 77 to position R by link 128. Pressurized fluid will then flow from supply port 85 to chambers 98 of cylinders 65 through conduits 95, 96 and 97. Fluid will also flow from chambers 99 to tank 106 through conduits 102 and 103, conduit 101 and conduit 118. Chamber 104 of cylinder 67 will be connected to tank through conduits 105 and 107. The pressure coated in conduit 121 by the fluid flowing from chambers 99 will cause retraction of the piston in cylinder 67, the retaining panel retracting until it engages panel 64. The latter will then carry retaining panel 66 forwardly, the freeflow conditions existing in cylinder 67 permitting this action to take place. During this action valve 79 will remain in position B.

When compressing panel 64 reaches it full forward position valve 78 will be shifted to position R and valve 77 to position B by link 128. Pressurized fluid will flow from port 85 through conduits 101, 102 and 103 to chambers 99 of cylinders 65, while fluid will flow from chambers 98 to tank 106 through conduits 96, 97 and 95. This will cause retracting movement of compressing panel 64. The blocking of fluid in chamber 104 will cause retaining panel 66 to be held in its forward or retaining position.

During the first portion of the retracting stroke of compressing panel 64, auxiliary panel valve 79 will remain in position B. However, at an intermediate point in this retracting movement valve 79 will be shifted from position B to position P by link 129. The movement of link 129 is controlled in this case by the retracting movement of panel 64, as described below. Chambers 108 of cylinders 69 are thus connectible to supply port 85 while chambers 116 are connected to exhaust port 86. However, the pistons of cylinders 69 are not extended immediately because supply port 85 is cut off from port 93 by valve 78 which is in position R.

When panel 64 reaches its fully retracted position, valve 78 will be shifted from position R to position N by link 128, valve 77 still remaining in position B. Supply port 85 will now be connected to port 93 to expand chambers 108, forcing auxiliary panel 68 forwardly. As panel 68 completes its pushing stroke, valve 79 will be shifted from position P to position R by the control linkage described below. Chambers 116 will thus be pressurized through conduits 113, 114 and 115, while chambers 108 are vented through conduits 111, 112 and 109. Auxiliary panel 68 will be retracted from the dotted line to the solid line position of Figure 5. As panel 68 reaches its fully retracted position, the control linkage will shift valve 79 from position R to position B. The fluid in chambers 116 will thus be blocked, holding panel 68 in its fully retracted position. During the forward and retracting movements of panel 68, valve 78 will remain in position N with compressing panel 64 in its fully retracted position. At the conclusion of the auxiliary panel retracting movement, the parts will be in the same position they were at the beginning of the cycle.

The purpose of conduit 122 and check valve 123 is to provide a safety means for insuring retraction of auxiliary panel 68 before the next compressing stroke of panel 64. It will be observed from an examination of Figure 5 that if auxiliary panel 68 were in an intermediate position between its retracted and forward positions, a space would be created between the outer end of panel 68 and the inner end of retaining panel 66. As compressing panel 64 executed its next compressing stroke, refuse would be forced through this space between panels 66 and 68 into the mechanism compartment. Conduit 122 and check valve 123 provide a means for supplying fluid pressure to chambers 116 of cylinders 69 as panel 64 starts its next compressing stroke. Assuming that valve 79 has been shifted to position R but that insufficient pressure has been supplied to chambers 116 to retract panel 68, the additional pressure supplied from conduit 97 will complete the retraction of the auxiliary panel.

The purpose of slave cylinder 124 is to shift valve 79 from position P to position R in cases where auxiliary panel 68 cannot complete its forward or pushing stroke. During the final stages of a truck filling operation, the refuse may be so compact that a pushing stroke of panel 68 cannot be completed. As will be noted below, the shifting of valve 79 from position P to position R is normally accomplished by a control linkage responsive to arrival of panel 68 at its full forward position. If panel 68 is halted in a partially forward position, the pressure at port 127 will increase, thus pressurizing chamber 126 of cylinder 124. The piston rod of cylinder 124 is connected to the control linkage described below in such a manner that it will operate this control linkage independently of the amount of forward travel of panel 68 to move valve 79 to position R, at a point when the supply pressure is just below that necessary to open relief valve 81. Panel 68 will thus be retracted, preventing any damage to the parts due to refuse being forced into the mechanism compartment upon the next compressing stroke of panel 64.

Figure 8 illustrates an alternative hydraulic arrangement for actuating auxiliary panel 68. This arrangement differs from that shown in Figure 7 in that panel 68 executes only its forward or pushing stroke while panel 64 is in fully retracted position. The retracting stroke of panel 68 is delayed until panel 64 has started its next compressing stroke and retaining panel 66 has been retracted to the solid line position of Figure 5.

One advantage of this alternative arrangement is that it prevents the possibility of refuse being dragged back by the auxiliary panel upon its retracting stroke into the mechanism compartment. When the truck is almost filled, the forward movement of auxiliary panel 68 may be accompanied by a tendency of refuse to rise behind the auxiliary panel, this refuse being supported by retaining panel 66 which is locked in its retaining position. If the auxiliary panel is then immediately retracted, this refuse will be pulled back toward the mechanism compartment where it may hinder operation of the unit or prevent full retraction of the auxiliary panel. If however the retracting movement of auxiliary panel 68 is delayed until retaining panel 66 is retracted, any refuse which has risen behind the auxiliary panel will drop, permitting free retraction of the auxiliary panel.

To accomplish these purposes, the alternative hydraulic circuit of Figure 8 changes auxiliary panel valve 79 so as to eliminate its retracting position R. Valve 79 is movable between a central or first position D in which port 93 is connected to exhaust port 86 and port 94 is blocked, a pushing position P in which port 93 is connectible to supply port 85 as before and port 94 is connected to exhaust port 86, and a holding position H in which, like position D, port 93 is connected to port 86 and port 94 blocked. A by-pass conduit 132 is provided between conduit 95 which leads to the compressing chambers of compressing panel cylinders 65 and conduit 113 which leads to the retracting chambers of auxiliary panel cylinders 69. A sequencing valve which may comprise a pressure relief valve 133 is inserted in conduit 95 between conduit 132 and branch conduits 96 and 97. Valve 133 is adapted to prevent flow from port 87 to chambers 98 until a predetermined pressure has been reached, this pressure being higher than that necessary to retract the pistons of cylinders 69. In order to permit by-passing of valve 133 on the float stroke of the compressing panel, a conduit 134 is provided between conduit 107 leading from tank 106 and conduits 96 and 97, conduit 134 being provided with a check valve 135. To by-pass valve 133 on the retracting stroke of the compressing panel, a conduit 136 is provided between conduits 96 and 97 and conduit 132, conduit 136 being provided with a check valve 137. Conduit 122 and check valve 123 are eliminated in this embodiment.

In the operation of the alternative embodiment of Figure 7, assume an initial condition in which compressing panel 64 is in its fully retracted position and valve 78 is in position N. At this time valve 79 will be in left hand or holding position H and auxiliary panel 68 will be held in its forward position, since retracting port 94 is blocked. Valve 77 will be in position B with retaining panel 66 locked in its retaining position. Upon movement of valve 78 to position F, panel 64 will float down to its intermediate position in the manner described above. Valve 79 will remain in left hand position H and valve 77 in position B.

When valve 78 is shifted to position C, port 87 will be connected to supply port 85 and the portion of conduit 95 between port 87 and valve 133 will be pressurized. At the same time, valve 77 will be shifted to position R and retaining panel 66 will be retracted as described above. However, compressing panel 64 will not immediately start its compressing stroke because valve 133 will not permit fluid to flow to chambers 98. Instead, fluid will flow through conduits 132, 113, 114 and 115 to chambers 116 of cylinders 69. Since chambers 108 are connected to tank 106 through port 93, the pistons of cylinders 69 will be retracted, moving auxiliary panel 68 to its fully retracted position. When this position has been reached, the pressure in conduit 95 will build up until relief valve 133 opens, thus permitting fluid flow to chambers 98. Compressing panel 64 will carry out its compressing stroke as described above. The arrival of auxiliary panel 68 at its fully retracted position will also cause valve 79 to shift into central or first position D through the control linkage described below. When in this position, port 94 will remain blocked while port 93 will still be connected to exhaust port 86. Auxiliary panel 68 will thus be held stationary in its retracted position.

When compressing panel 64 reaches its full forward position, valve 78 will be shifted to position R and retaining panel valve 77 will be moved to position B, locking the retaining panel in its retaining position. With valve 78 in position R, port 88 will be connected to supply port 85 and chambers 99 of cylinders 65 will be pressurized. The fluid flowing from chambers 98 will by-pass valve 133 through conduit 136, check valve 137, conduit 132 and conduit 95 to port 87 connected to exhaust port 86. This fluid flow will also maintain sufficient pressure in chambers 116 of cylinders 69 to maintain auxiliary panel 68 in its retracted position. As in the previous embodiment, the compressing panel during its retracting movement will shift auxiliary panel valve 79 from first position D to position P in which port 93 is connectible to supply and port 94 vented.

When compressing panel 64 reaches its fully retracted position, valve 78 will be shifted to position N. This will connect fluid supply to port 93 to extend the pistons of cylinders 69, auxiliary panel 68 executing a forward or pushing stroke. Upon reaching its full forward position, the linkage connected to auxiliary panel 68 will shift valve 79 from position P to left hand position H in which port 94 is blocked and port 93 vented. The auxiliary panel actuating means will thus be deactivated and the cycle will have been completed. It will be noted that the function of slave cylinder 124 remains the same in the alternative embodiment, but that the conduit 122 and check valve 123 are not necessary since conduit 132 by-passes conduit 122.

Figure 9 shows suitable details of construction of valve body 76, compressing panel valve 78, auxiliary panel valve 79 and relief valve 81. The construction includes a housing 138 having a supply chamber 139 and an exhaust chamber 141 therein. Chamber 139 extends from the lower portion of housing 138 into the central portion and serves to supply pressurized fluid from supply port 85 to valves 78 and 79. Chamber 141 is disposed at the outer portions of housing 138 and is separated from chamber 139 by an interior wall 142 which is of convoluted shape and also serves to form valve seats for valves 78 and 79. Exhaust port 86 is disposed at the upper central portion of housing 138 and is connected with chamber 141. Housing 138 is also provided with a chamber 143 for port 87, a chamber 144 for port 88, and chambers 145 and 146 for ports 93 and 94 respectively. These chambers are formed in thickened portions of interior wall 142, ports 87, 88, 93 and 94 extending from their respective chambers out of the plane of the paper in Figure 9. Wall 142 is provided with a valve seat 147 between chambers 139 and 143, a seat 148 between chambers 143 and 141, a seat 149 between chambers 139 and 144, and a seat 151 between chambers 144 and 141.

An interior chamber 152 for transmitting fluid from supply chamber 139 to valve 79 is also provided in the central portion of housing 138 between the convolutions of interior wall 142. The interior wall is provided with a seat 153 between chambers 152 and 145, a seat 154 between chambers 145 and 141, a seat 155 between chambers 152 and 146, and a seat 156 between chambers 146 and 141. Further provided on interior wall 142 are seats 157, 158, 159 and 161 between chambers 139 and 152. Of these seat 157 is adjacent chamber 143, seat 158 adjacent chamber 144, seat 159 adjacent chamber 145 and seat 161 adjacent chamber 146. Slave cylinder port 127 is connected with interior chamber 152 and leads from said chamber out of the plane of the paper in Figure 9.

Valve spool 82 of valve 78 extends through housing 138 at approximately the central portion thereof and is engaged by seals 162 and 163 in the walls of said housing. Spool 82 is provided with a land 164 for seats 147 and 148, a land 165 for seats 149 and 151, and a central land 166 for seats 157 and 158. Spool 82 is also provided with an eye 167 for connection with link 83 and an eye 168 for connection with link 128. Spool 131 of valve 79 extends through the upper portion of housing 138 and is sealed similarly to spool 82. Spool 131 is provided with a land 169 for seats 153 and 154, a land 171 for seats 155 and 156 and a central land 172 for seats 159 and 161. This spool is also provided with an eye 173 for connection with link 129 and a stop 174 for limiting movement in a leftward direction.

Relief valve 81 comprises a pin 175 threadably mounted at 176 in a bushing 177 and secured thereto by a lock nut 178. A compression spring 179 is mounted on pin 175 between an end shoulder 181 and the interior of a valve slide 182. The latter is slidably mounted in a bore in housing 138 which connects chambers 139 and 141 and is provided with a differential pressure area represented by shoulder 183. Slide 182 is provided with ports 184 which serve to connect chambers 139 and 141 when the slide is moved rightwards in Figure 8, spring 179 normally urging slide 182 to the left in which ports 184 are sealed off. A chamber 185 between the head of slide 182 and bushing 177 is connected with chamber 139 by passages 186 and serves to move slide 182 to the right when the relief pressure has been attained.

The operation of the valves in valve body 76 will be obvious from the foregoing description. When valve spool 82 is in position F chamber 143 will be connected to chambers 139 and 141, chamber 144 will be connected to chamber 141, and interior chamber 152 will be connected to supply chamber 139. In position C, chamber 143 will be connected to supply chamber 139 and chamber 144 to exhaust chamber 141. Chamber 152 will be cut off from chamber 139 by the cooperation of lands 166 and 165 with seats 157 and 158 respectively. In position R, the connections of chambers 143 and 144 will be reversed, chamber 143 being connected to chamber 141 and chamber 144 to chamber 139. Interior chamber 152 will still be cut off from supply chamber 139, this time by cooperation of land 166 with seat 158 and land 164 with seat 157. In position N, both chambers 143 and 144 will be sealed, and chamber 152 will be connected to chamber 139 as shown in Figure 9.

When spool 131 is in position B, chambers 145 and 146 will be sealed and interior chamber 152 connected to exhaust chamber 141. In position P, chamber 145 will be connected to chamber 152 while chamber 146 is connected to chamber 141, chambers 152 and 141 being cut off from each other. When spool 131 is in position R, chamber 145 is connected with exhaust chamber 141 and chamber 146 with interior chamber 152, chambers 152 and 141 still being relatively sealed.

Figure 10 shows an alternative construction of valve 79 for use with the alternative hydraulic circuit shown in Figure 8. This alternative construction includes a land 187 on valve spool 131 which is displaced axially from the position of land 171, and a land 188 which is of shorter length than land 169. The construction also substitutes a stop 189 which is mounted so as to limit the leftward movement of spool 131 to a lesser distance than is permitted by stop 174.

The positions of alternate auxiliary panel valve 79 are marked in Figure 10. It will be seen that with the spool in left hand position H chamber 145 is connected to exhaust chamber 141 while chamber 146 is sealed. Interior chamber 152 is connected to exhaust chamber 141. In central position D chambers 145 and 152 maintain their connections with chamber 141 while chamber 146 is still sealed. In position P chamber 145 is connected to chamber 152, chamber 146 is connected to exhaust chamber 141, and the interior and exhaust chambers are sealed from each other.

Figures 11–13 show in schematic fashion a suitable control linkage for shifting auxiliary panel valve 79 in accordance with the positions of compressing panel 64 and auxiliary panel 68. As indicated above, valve 79 is shifted into position P as compressing panel 64 executes its retracting stroke. In both embodiments of the hydraulic arrangement, valve 79 is shifted to its left hand position when auxiliary panel 68 completes its forward or pushing stroke and is shifted to its central position when the auxiliary panel completes its retracting stroke. Although these movements occur in the two hydraulic embodiments at different times with respect to the position of compressing panel 64, the same control linkage is utilized in both embodiments.

The linkage comprises a rotatable shaft 191 having a toggle arm 192 and arms 193 and 194 for connection to various parts of the linkage. A spring 195 is engageable with toggle arm 192 to complete the toggle arrangement for shaft 191. Toggle 192 is connected to spool 131 of valve 79 by means of a link 196, a bell crank 197 and link 129. The arrangement is such that when toggle 192 is in its upper position as shown in Figures 11 and 13, spool 131 is urged to the right. If toggle 192 is shifted overcenter from its upper position, spring 195 will urge spool 131 to the left.

A sleeve 198 is fixed to link 29 and is engageable with a stop 199 supported by an arm 201, the stop being movable between a blocking position and a retracting position with respect to sleeve 198. The arrangement is such that sleeve 198 is movable to the left of stop 199 so that upon subsequent rightward movement a shoulder 202 of sleeve 198 will abut stop 199. If stop 199 is lifted clear of shoulder 202, sleeve 198 and link 129 will be allowed to move to the right, and stop 199 will ride on the outer surface of sleeve 198. The upper end of arm 201 has a lug 203 engageable by a tripping member 204 on shaft 205 of compressing panel 64. Member 204 is engageable with lug 203 when panel 64 is moving in its retracting direction as shown by the arrow 206 of Figure 11 but is not operatively engageable with the lug when moving in the opposite direction. Engagement of member 204 with lug 203 will cause lifting of arm 201 so that stop 199 is clear of sleeve 198. This actuation is momentary, and as panel 64 reaches its fully retracted position member 204 will release lug 203 and allow stop 199 to drop onto the surface of sleeve 198.

A link 207 is connected between arm 193 on shaft 191 and a bell crank 208 which is positioned rearwardly of auxiliary panel 68. Arm 209 of bell crank 208 is disposed between a pair of spaced shoulders 211 and 212 fixed on a rod 213 which is pivoted at 214 to panel 68 and extends rearwardly therefrom. The relative positions of stops 211 and 212 and arm 209 are such that when panel 68 approaches its full forward position as shown in Figure 12, shoulder 211 will engage arm 209, while movement of panel 68 to its fully retracted position will cause engagement of shoulder 212 with arm 209. The engagement of shoulder 211 with arm 209 will cause toggle 198 to shift overcenter downwardly, pulling valve spool 131 into its extreme left hand position as shown in Figure 12. In this left hand position, shoulder 202 of sleeve 198 will be carried past stop 199, the latter dropping into blocking relation with shoulder 202. However, shoulder 202 will be withdrawn to such a distance that a space will exist between this shoulder and stop 199.

When stop 212 engages arm 209 of bell crank 208, toggle 192 will be shifted overcenter upwardly to cause rightward movement of link 129 until shoulder 202 abuts stop 199. This will result in the central positioning of valve spool 131, as shown in Figure 13. In this position spring 195 is not fully expanded, so that when stop 199 is lifted from blocking engagement with shoulder 202, spring 195 will expand further to move valve spool 131 into its right hand position shown in Figure 11. When in this right hand position, stop 199 will ride on sleeve 198, thus permitting the sleeve to be drawn leftwardly when the linkage is moved in the opposite direction.

In the operation of the control linkage with the hydraulic system of Figures 7 and 9, assume an initial condition in which the compressing panel is fully retracted and the mechanism is at rest. The linkage will be in the position shown in Figure 13, with valve spool 131 in its central position and shoulder 202 abutting stop 199. The floating and compressing movements of compressing panel 64 will not affect the position of the control linkage which will remain in the position of Figure 13. During retracting movement of compressing panel 64, member 204 will momentarily engage lug 203, lifting arm 201 and withdrawing stop 199 from shoulder 202. Spring 195 will urge link 129 to the right through bell crank 197, and valve spool 131 will be moved into right hand pushing position P, as shown in Figure 11, stop 199 resting on sleeve 198.

After panel 64 has reached its fully retracted position, auxiliary panel 68 will move forwardly (to the right in Figure 11) and at the end of this movement shoulder 211 will engage arm 209 of bell crank 208. This will move link 207 downwardly and throw toggle 192 overcenter downwardly to the position shown in Figure 12. This will cause valve spool 131 to move into its left hand or retracting position R. During this movement sleeve 198 will slide under stop 199, the latter dropping into alignment with shoulder 202 which however is spaced from stop 199. Auxiliary panel 68 will be retracted and at the end of this retracting movement shoulder 212 will engage arm 209 of bell crank 208. This will lift link 207 and cause toggle 192 to be shifted overcenter upwardly. Spring 195 will expand until shoulder 202 of sleeve 198 engages stop 199 as shown in Figure 13. Valve spool 131 will thus be in its central or blocking position in readiness for another cycle.

In the operation of the control linkage with the alternative hydraulic arrangement shown in Figures 8 and 10, again assume an initial condition in which the compressing panel is fully retracted and the parts are at rest. In this case, auxiliary panel 68 will be in its forward position and the toggle will be in its downward position with valve spool 131 in its holding position H, shown in Figure 12, in which the auxiliary panel is held in its forward position. When compressing panel 64 has completed its floating stroke, is beginning its compressing stroke and retaining panel 66 has been retracted, the pistons of cylinders 69 will be retracted by the hydraulic arrangement previously described. This will cause shoulder 212 to engage arm 209 of bell crank 208 as auxiliary panel 68 reaches its fully retracted position. The toggle will be shifted overcenter upwardly from the position of Figure 12 to the position of Figure 13 with shoulder 202 abutting stop 199. Valve spool 131 will be shifted from position H to its central or first position D in which the auxiliary panel actuating means remains deactivated.

During retracting movement of compressing panel 64 member 204 will engage lug 203, lifting stop 199 and permitting link 129 to move rightwardly by the expansion of spring 195. Valve spool 131 will be shifted into its pushing position P as shown in Figure 11. When compressing panel 64 reaches its fully retracted position, auxiliary panel 68 will be moved forwardly by cylinders 69 and after a predetermined forward movement shoulder 211 will engage arm 209 of bell crank 208. The toggle will be shifted overcenter downwardly pulling link 129 to the left as shown in Figure 12. Valve spool 131 will be shifted into position H halting movement of auxiliary panel 68 in its forward position in readiness for another cycle.

Slave cylinder 126 cooperates with the control linkage to throw toggle 192 into its downward position in cases where auxiliary panel 68 cannot complete its forward stroke. It will be seen that fluid pressure applied to cylinder 126 will cause arm 194 to swing counterclockwise, thus rotating shaft 199 and shifting toggle 192 downwardly. In order to control the operation of cylinder 126 with respect to the pressure in conduit 125, arm 194 is preferably of adjustable length. Due to its relatively small volume, slave cylinder 126 does not interfere with the clockwise movement of shaft 191.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What is claimed is:

1. In combination with a receptacle having an end opening, a tail gate swingable between a closed position for holding material in said receptacle and a dumping position away from said end opening, a hopper carried by said tail gate, a compressing panel at the lower end of said hopper swingable from a retracted position away from said hopper to a compressing position forcing material from said hopper forwardly and upwardly into said end opening, a retaining panel movable with said compressing panel to its compressing position and lockable to retain the compressed material when the compressing panel is retracted, an auxiliary panel supported by said tail gate above said compressing panel and retaining panel, said auxiliary panel being movable between a retracted position adjacent said end opening and a forward position toward the other end of said receptacle, and interconnecting means between said compressing panel and said auxiliary panel, the auxiliary panel being movable by said interconnecting means to its forward position when said compressing panel is retracted.

2. The combination according to claim 1, said interconnecting means including a crank arm supported by said tail gate for swinging movement, a link connected between said compressing panel and said crank arm, and an actuating link connecting said crank arm to said auxiliary panel.

3. In combination with a receptacle having an end opening, a tail gate swingable between a closed position for holding material in said receptacle and a dumping position away from said end opening, a hopper carried by said tail gate, a compressing panel swingable from a retracted position away from said hopper to a compressing position forcing material from said hopper into said end opening, a retaining panel movable with said compressing panel to its compressing position and lockable to retain the compressed material when the compressing panel is retracted, an auxiliary panel, said auxiliary panel being movable between a retracted position adjacent said end opening and a forward position a substantial distance beyond said retaining panel, interconnecting means between said compressing panel and said auxiliary panel, the auxiliary panel being movable by said interconnecting means to its forward position when said compressing panel is retracted, and supporting means for said auxiliary panel including a pair of substantially parallel links pivotally connected between said auxiliary panel and said tail gate, the auxiliary panel being restrained by said links to substantially translatory movement.

4. In combination with a receptacle having an opening at one end thereof, a compressing panel at the lower end of said opening, said compressing panel being movable from a retracted position forwardly into a compressing position to urge material into said receptacle, a pivotally mounted retaining panel slightly in advance of and adjacent to said compressing panel when the compressing panel is in its forward position, said retaining panel being movable into a retaining position to retain the compressed material when said compressing panel is retracted, an auxiliary panel at the upper end of said opening, said auxiliary panel being movable from a retracted position in a direction into and toward the other end of said receptacle and being adapted to engage the upper portions of said compressed material during said movement and force said material well into the body, and interconnecting means between said compressing and auxiliary panels for causing said movement of the auxiliary panel to take place when said compressing panel is away from its compressing position.

5. The combination according to claim 4, further provided with a shield plate hinged to said auxiliary panel and movable adjacent said retaining panel to prevent the discharge of material between said auxiliary and retaining panels.

6. In combination with a receptacle having an opening at one end thereof, a compressing panel at the lower end of said opening, said compressing panel being movable from a retracted position forwardly into a compressing position to urge material into said receptacle, a retaining panel adjacent said compressing panel, said retaining panel being movable into a retaining position to retain the compressed material when said compressing panel is retracted, an auxiliary panel at the upper end of said opening, said auxiliary panel being movable from a retracted position in a direction toward the other end of said receptacle and being engageable during said movement with the upper portions of said compressed material, and means interconnecting said compressing panel and said auxiliary panel, the auxiliary panel being movable by said interconnecting means from its retracted position toward said other end of the receptacle when said compressing panel moves to its retracted position.

7. In combination with a receptacle having an opening at one end thereof, a compressing panel at the lower end of said opening, said compressing panel being movable from a retracted position forwardly into a compressing position to urge material into said receptacle, a retaining panel adjacent said compressing panel, said retaining panel being movable into a retaining position to retain the compressed material when said compressing panel is retracted, an auxiliary panel at the upper end of said opening, said auxiliary panel being movable from a retracted position in a direction toward the other end of said receptacle and being engageable during said movement with the upper portions of said compressed material, actuating means for said compressing panel, a swingable crank arm operated by said actuating means, and a link operatively connecting said crank arm to said auxiliary panel.

8. A device for loading and compressing material into a receptacle, including a hopper, a compressing panel swingable in said hopper forwardly and upwardly between a retracted and a compressing position, a retaining panel movable with said compressing panel to its compressing position and lockable to retain the compressed material when the compressing panel is retracted, an auxiliary panel disposed above said hopper and movable between a retracted and a forward position, interconnecting means between said compressing panel and auxiliary panel, said auxiliary panel being movable by said interconnecting means into and toward the other end of said receptacle to its forward position when said compressing panel is retracted, a retaining member between said compressing panel and said auxiliary panel, a shield plate hinged to said auxiliary panel and movable adjacent said retaining member, an upper shield plate for said auxiliary panel, and means for maintaining contact between said upper shield plate and the upper portion of the receptacle.

9. In combination, a vehicle having a refuse receiving compartment provided with an opening in the lower portion of its rear wall, a receiving hopper adjacent said opening, a compressing panel movable toward and away from said opening and effective to compress refuse in said hopper forwardly through the opening and into the compartment during at least a portion of its movement toward said opening, a retaining panel movable between a retaining position in which it closes said opening and a retracted position, an auxiliary panel positioned within the compartment above said opening and movable forwardly and rearwardly and effective on its forward movement to push refuse toward the forward end of the compartment, means for moving said compressing panel toward and away from said opening, and a mechanical connection between said compressing and auxiliary panels for effecting forward pushing movement of said auxiliary panel during movement of the compressing panel away from said opening.

10. In combination, a vehicle having a refuse receiving compartment provided with an opening in the lower portion of its rear wall, a receiving hopper adjacent said opening, a compressing panel movable toward and away from said opening and effective to compress refuse in said hopper forwardly through the opening and into the compartment during at least a portion of its movement toward said opening, a retaining panel movable between a retaining position in which it closes said opening and a retracted position, an auxiliary panel positioned within the compartment above said opening and movable forwardly and rearwardly and effective on its forward movement to push refuse toward the forward end of the compartment, means for moving said compressing panel toward and away from said opening, and means interconnected with said compressing panel moving means for effecting first the forward and then the rearward movements of said auxiliary panel between the start of the rearward movement of the compressing panel and the end of the next forward compressing movement of the compressing panel.

11. In combination, a vehicle having a refuse receiving compartment provided with an opening in the lower portion of its rear wall, a receiving hopper adjacent said opening, a compressing panel movable toward and away from said opening and effective to compress refuse in said hopper forwardly through the opening and into the compartment during at least a portion of its movement toward said opening, a retaining panel movable between a retaining position in which it closes said opening and a retracted position, an auxiliary panel positioned within the compartment above said opening and movable forwardly and rearwardly and effective on its forward movement to push refuse toward the forward end of the compartment, means for moving said compressing panel toward and away from said opening, a mechanical connection between said compressing and auxiliary panels for effecting forward pushing movement of said auxiliary panel during movement of the compressing panel away from said opening, means to move the retaining panel into retaining position on completion of the forward movement of the compressing panel, and means to hold the retaining panel in retaining position until after the forward movement of the auxiliary panel is completed.

12. In combination, a vehicle having a refuse receiving compartment provided with an opening in the lower portion of its rear wall, a receiving hopper adjacent said opening, a compressing panel movable toward and away from said opening and effective to compress refuse in said hopper forwardly through the opening and into the compartment during at least a portion of its movement toward said opening, a retaining panel movable between a retaining position in which it closes said opening and a retracted position, an auxiliary panel positioned within the compartment above said opening and movable forwardly and rearwardly and effective on its forward movement to push material toward the forward end of the compartment, means for moving said compressing panel toward and away from said opening, means interconnected with said compressing panel moving means for effecting first the forward and then the rearward movement of said auxiliary panel between the start of the rearward movement of the compressing panel and the end of the next forward compressing movement of the compressing panel, means to move the retaining panel into retaining position on completion of the forward movement of the compressing panel, and means to hold the retaining panel in retaining position until after the forward movement of the auxiliary panel is completed.

13. In combination, a vehicle having a refuse receiving compartment provided with an opening in the lower portion of its rear wall, a receiving hopper adjacent said opening, a compressing panel, actuating means for said compressing panel effective to hold said panel in a fully retracted position and to move said panel from said fully retracted position toward and then away from said opening, said compressing panel being effective to compress refuse in said hopper forwardly through the opening and into the compartment during at least a portion of its movement toward said opening, a retaining panel movable between a retaining position in which it closes said opening and a retracted position, an auxiliary panel positioned within the compartment above said opening and movable forwardly and rearwardly and effective on its forward movement to push refuse toward the forward end of the compartment, and means interconnected with said compressing panel actuating means for effecting first the forward and then the rearward movements of said auxiliary panel while said compressing panel is held in its fully retracted position.

14. In combination, a vehicle having a refuse receiving compartment provided with an opening in the lower portion of its rear wall, a receiving hopper adjacent said opening, a compressing panel, hydraulic actuating means for said compressing panel effective to hold said panel in a fully retracted position and to move said panel from said fully retracted position toward and then away from said opening, said compressing panel being effective to compress refuse in said hopper forwardly through the opening and into the compartment during at least a portion of its movement toward said opening, a retaining panel movable between a retaining position in which it closes said opening and a retracted position, an auxiliary panel positioned within the compartment above said opening and movable forwardly and rearwardly and effective on its forward movement to push refuse toward the forward end of the compartment, hydraulic actuating means for said auxiliary panel, and means interconnecting the hydraulic actuating means of said compressing and auxiliary panels for effecting first the forward and then the rearward movements of said auxiliary panel between the start of the rearward movement of the compressing panel and the end of the next forward compressing movement of the compressing panel.

15. The combination according to claim 14, further provided with a valve for controlling said auxiliary panel actuating means, said valve being movable between a first position in which said auxiliary panel is deactivated and a pushing position causing forward movement of said auxiliary panel, and means responsive to movement of said compressing panel away from said opening for shifting said valve from said first position to said pushing position.

16. The combination according to claim 15, said valve being further movable to a retracting position causing rearward movement of said auxiliary panel, means responsive to a predetermined forward movement of said auxiliary panel to shift said valve from its pushing position to its retracting position, and means responsive to a predetermined rearward movement of said auxiliary panel to shift said valve from its retracting position to its first position.

17. The combination according to claim 15, said valve being further movable from said pushing position to a holding position in which said auxiliary panel is halted, means responsive to a predetermined forward movement of said auxiliary panel to shift said valve from its pushing position to its holding position, means responsive to forward urging of said compressing panel by said compressing panel actuating means for moving said retaining panel toward its retracted position, and means responsive to said forward urging of the compressing panel actuating means for causing said auxiliary panel actuating means to move said auxiliary panel rearwardly independently of the position of said auxiliary panel valve as said retaining panel moves toward its retracted position.

18. In combination, a vehicle having a refuse receiving compartment provided with an opening in the lower portion of its rear wall, a receiving hopper adjacent said opening, a compressing panel movable between a fully retracted position away from said opening, an intermediate position and a forward position, actuating means for said compressing panel, a first controller for said actuating means shiftable between a neutral position holding said compressing panel in its fully retracted position, a float position allowing said compressing panel to move from said fully retracted position to said intermediate position, a compressing position forcing said compressing panel to its forward position and a retracting position moving said compressing panel from said forward position to said fully retracted position, the compressing panel being effective to compress refuse in said hopper forwardly through said opening and into the compartment during its movement from said intermediate position to said forward position, a retaining panel movable between a retaining position in which it closes said opening and a retracted position, means responsive to movement of said compressing panel actuating means to its compressing position for moving said retaining panel to its retracted position, an auxiliary panel positioned within the compartment above said opening, actuating means for said auxiliary panel, a second controller for said last-mentioned actuating means shiftable between a first position in which said auxiliary panel actuating means is deactivated, a pushing position in which said auxiliary panel is moved forwardly and a holding position in which said auxiliary panel is halted, means responsive to movement of said compressing panel toward its retracted position to shift said second controller from said first position to said pushing position, means responsive to a predetermined forward movement of said auxiliary panel to shift said second controller from said pushing position to said holding position, means responsive to movement of said first controller to its compressing position for retracting said auxiliary panel, and means responsive to a predetermined retraction of said auxiliary panel for shifting said second controller from said holding position to said first position.

19. In combination, a vehicle having a refuse receiving compartment provided with an opening in the lower portion of its rear wall, a receiving hopper adjacent said opening, a compressing panel, hydraulic actuating means for said compressing panel effective to hold said panel in a fully retracted position and to move said panel from said fully retracted position toward and then away from said opening, said compressing panel being effective to compress refuse in said hopper forwardly through the opening and into the compartment during at least a portion of its movement toward said opening, a retaining panel movable between a retaining position in which it closes said opening and a retracted position, an auxiliary panel positioned within the compartment above said opening and movable forwardly and rearwardly and effective on its forward movement to push refuse toward the forward end of the compartment, hydraulic actuating means for said auxiliary panel, a valve for controlling said last-mentioned hydraulic actuating means, said valve being shiftable between a first position in which said auxiliary panel is stationary and a pushing position in which said auxiliary panel is moved forwardly, an operating linkage for said valve including a toggle adapted in one position to urge said valve from said first position to said pushing position, a stop movable between a blocking position restraining movement of said valve to said pushing position in a retracted position allowing such movement, and means responsive to movement of said compressing panel away from said opening to move said stop from said blocking position to said retracted position.

20. The combination according to claim 19, said valve being further movable to a retracting position causing rearward movement of said auxiliary panel, said toggle when shifted overcenter from said one position causing said valve to move into said retracting position, and means responsive to a predetermined forward movement of said auxiliary panel for throwing said toggle overcenter from said one position.

21. The combination according to claim 20, further provided wtih means responsive to a predetermined rearward movement of said auxiliary panel to shift said toggle overcenter to said one position, whereby said valve is shifted from said retracting position to said first position.

22. The combination according to claim 20, further provided with a slave cylinder connected between said auxiliary panel actuating means and said toggle, said slave cylinder being responsive to the attainment of a predetermined fluid pressure in said auxiliary panel actuating means for shifting said toggle overcenter from said one position, whereby said valve is shifted into its retracting position independently of the amount of forward movement of said auxiliary panel.

23. The combination according to claim 19, said valve being further movable to a holding position in which said auxiliary panel is halted, said toggle when thrown overcenter from said one position moving said valve into said holding position, and means responsive to a predetermined forward movement of said auxiliary panel for shifting said toggle overcenter from said one position.

24. The combination according to claim 23, further provided with means for supplying fluid to said compressing panel actuating means for effecting the forward movement of said compressing panel, means for initially diverting said fluid from said compressing panel actuating means to said auxiliary panel actuating means to retract said auxiliary panel independently of the position of said valve, and means responsive to a predetermined retracting movement of said auxiliary panel to shift said toggle overcenter to said one position whereby said valve is moved from said holding position to said first position.

25. The combination according to claim 24, further provided with a slave cylinder connected between said auxiliary panel actuating means and said toggle, said slave cylinder being effective to throw said toggle overcenter from said one position when a predetermined pressure is attained in said auxiliary panel actuating means, whereby said valve is shifted from said pushing position to said holding position independently of the amount of forward movement of said auxiliary panel.

References Cited in the file of this patent

UNITED STATES PATENTS

| | | |
|---|---|---|
| 2,212,058 | Wood | Aug. 20, 1940 |
| 2,371,540 | Mott | Mar. 13, 1945 |
| 2,649,216 | Gollnick | Aug. 18, 1953 |
| 2,699,268 | Miller | Jan. 11, 1955 |
| 2,703,184 | Barrett | Mar. 1, 1955 |
| 2,733,820 | Starr | Feb. 7, 1956 |